(12) United States Patent
D'Amato

(10) Patent No.: US 10,985,982 B2
(45) Date of Patent: Apr. 20, 2021

(54) PROXIMAL PLAYBACK DEVICES

(71) Applicant: Sonos, Inc, Santa Barbara, CA (US)

(72) Inventor: Nick D'Amato, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 68 days.

(21) Appl. No.: 15/717,292

(22) Filed: Sep. 27, 2017

(65) Prior Publication Data

US 2019/0097886 A1 Mar. 28, 2019

(51) Int. Cl.
| | |
|---|---|
| *H04L 12/24* | (2006.01) |
| *H04W 8/00* | (2009.01) |
| *H04W 4/80* | (2018.01) |
| *H04L 12/26* | (2006.01) |
| *H04L 12/28* | (2006.01) |

(52) U.S. Cl.
CPC ...... *H04L 41/0816* (2013.01); *H04L 12/2805* (2013.01); *H04L 41/0813* (2013.01); *H04L 41/0893* (2013.01); *H04L 43/08* (2013.01); *H04W 4/80* (2018.02); *H04W 8/005* (2013.01);

(Continued)

(58) Field of Classification Search
CPC .......... G08C 17/02; G08C 2201/93; G08C 2201/40; G08C 2201/11; G08C 2201/114; G08C 2201/12; G08C 2201/42; G08C 2201/71; G08C 2201/92; G08C 23/04; Y02D 70/142; Y02D 70/144; Y02D 70/164; Y02D 70/00; Y02D 70/1262; Y02D 70/1224; Y02D 70/1242; Y02D 70/146; Y02D 70/1244; Y02D 70/24; Y02D 70/23; Y02D 70/1246; Y02D 70/1264; Y02D 70/26; Y02D 70/1226; Y02D 10/126; Y02D 70/12; Y02D 70/1222; Y02D 70/166; Y02D 70/21; Y02D 10/172; H04L 12/2805; H04L 2012/2841; H04L 2012/2849; H04L 41/0813; H04L 41/0816; H04L 41/0893; H04L 43/08; H04L 43/50; H04W 4/80; H04W 8/005
See application file for complete search history.

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |

(Continued)

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.

(Continued)

*Primary Examiner* — Luat Phung
*Assistant Examiner* — Zhaohui Yang

(57) ABSTRACT

Systems and methods disclosed herein include, determining a proximity of the first networked device to a second networked device, determining whether there is a wired network connection existing between the first networked device and the second networked device, and in response to determining the proximity and the existence of a wired network connection, reconfiguring one or more operational parameters of one or both of the first networked device and the second networked device.

20 Claims, 7 Drawing Sheets

(52) U.S. Cl.
CPC ...... *H04L 43/50* (2013.01); *H04L 2012/2841* (2013.01); *H04L 2012/2849* (2013.01)

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington et al. |
| 8,483,853 | B1 | 7/2013 | Lambourne |
| 8,942,252 | B2 | 1/2015 | Balassanian et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty |
| 2004/0024478 | A1 | 2/2004 | Hans et al. |
| 2007/0142944 | A1 | 6/2007 | Goldberg et al. |
| 2009/0058707 | A1* | 3/2009 | Craze ................ G08C 17/00 341/176 |
| 2013/0231766 | A1* | 9/2013 | Millington ............ G06F 1/00 700/94 |
| 2014/0146865 | A1* | 5/2014 | Lagnado ............. H01Q 1/44 375/225 |
| 2014/0157026 | A1* | 6/2014 | So ................. G06F 1/3206 713/323 |
| 2014/0273849 | A1* | 9/2014 | Lee ................ G06F 1/1694 455/41.2 |
| 2015/0081072 | A1* | 3/2015 | Kallai ............... H03G 5/005 700/94 |
| 2015/0133185 | A1* | 5/2015 | Chen ............... H04W 72/1215 455/552.1 |
| 2016/0007141 | A1* | 1/2016 | Anantharangachar .. H04W 4/80 709/219 |
| 2016/0124476 | A1* | 5/2016 | Mittal ............... G06F 1/3206 713/320 |
| 2017/0104550 | A1* | 4/2017 | Rajapakse ............. H04H 20/18 |
| 2017/0372465 | A1* | 12/2017 | Forutanpour ........... G06K 9/52 |
| 2018/0302507 | A1* | 10/2018 | Johnson ............... H04W 76/14 |
| 2018/0317079 | A1* | 11/2018 | Kang ................. H04W 8/005 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

PROXIMAL PLAYBACK DEVICES

FIELD OF THE DISCLOSURE

The disclosure is related to consumer goods and, more particularly, to methods, systems, products, features, services, and other elements directed to media playback and aspects thereof.

BACKGROUND

Options for accessing and listening to digital audio in an out-loud setting were limited until in 2003, when Sonos, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

SUMMARY

The present disclosure describes systems and methods for, among other things, determining a proximity of networked devices and reconfiguring operational parameters of the networked devices in proximity with one another. An example of two devices in proximity with one another is when two or more networked devices are stacked on top of one another or perhaps placed next to one another. In another example, two networked devices are in proximity with one another when they are in physical contact with one another. In the context of this disclosure, a first networked device is in proximity with a second networked device when the two networked devices are sufficiently close to each other (typically within a few inches to a few feet, depending on the devices) such that heat radiated and/or radio-frequency signals emitted from the first networked device affects (or at least has a likelihood of affecting) the operation or performance of the second networked device (or vice versa). For example, in the above-mentioned scenario where a first networked device is stacked on top of a second networked device, heat rising from the second networked device may cause the first networked device to get hotter than it otherwise would get during normal operation if the first networked device were not in such close proximity to the second networked device, and this additional heat may affect the performance or operation of the first networked device by, for example, causing the first networked device to down-speed its processor, power-off certain components, and/or run a fan to prevent overheating.

The present disclosure describes many examples for determining a proximity of networked devices under many different configuration scenarios. The disclosed examples describe functions performed by networked devices, voice enabled devices (VEDs), networked microphone devices (NMDs), audio playback devices (PBDs), and video playback devices (VPDs), all of which are described in more detail herein. As used herein the term networked device is a class of devices that includes, but is not limited to VEDs, NMDs, PBDs, and VPDs.

Some examples include determining a proximity of a first networked device to a second networked device; determining whether there is a wired network connection existing between the first networked device and the second networked device; and in response to determining the proximity and the existence of a wired network connection, reconfiguring one or more operational parameters of one or both of the first networked device and the second networked device.

In some examples, determining the proximity of the first networked device to the second networked device involves comparing a current radio signature of the first networked device with an expected radio signature for the first networked device.

In some examples, determining the proximity of the first networked device to the second networked device additionally or alternatively involves determining the proximity based on a Bluetooth (or other type of communication protocol) connection between the first networked device and the second network device. In one case, determining whether the first networked device and the second network device are within a proximity of each other may involve determining whether a received signal strength indication (RSSI) of the Bluetooth connection between the first networked device and the second networked device is above a threshold strength.

In some examples, determining the proximity of the first networked device to the second networked device additionally or alternatively involves determining whether a proximity sensor on the first networked device detects the presence of the second networked device.

In some examples, determining the proximity of the first networked device to the second networked device additionally or alternatively involves determining whether the first networked device and the second networked device are within a threshold distance using a near-field communication (NFC) protocol.

In some examples, determining the proximity of the first networked device to the second networked device additionally or alternatively involves receiving, by the first networked device, a message indicating the second networked device is in proximity to the first networked device.

In some examples, determining the proximity of the first networked device to the second networked device additionally or alternatively involves determining whether an orientation sensor on the first networked device indicates the first networked device and the second networked device are in a stacked configuration.

In some examples, determining the proximity of the first networked device to the second networked device additionally or alternatively involves receiving an input from a user indicating the first networked device and the second networked device are in proximity to each other.

In some examples, determining whether a wired network connection exists between the first networked device and the second networked device involves one or both of the first networked device and/or second networked device determining whether the first networked device and the second networked device can communicate with each other via one or more wired network interfaces.

In some examples, reconfiguring one or more operational parameters of one or both of the first networked device and the second networked device involves modifying one or more wireless network configuration parameters of one or both of the first networked device and the second networked device.

In some examples, modifying one or more wireless network configuration parameters of one or both of the first networked device and the second networked device involves disabling at least one wireless antenna of one or both of the first networked device and the second networked device.

In some examples, modifying one or more wireless network configuration parameters of one or both of the first networked device and the second networked device additionally or alternatively involves reducing a power at which at least one wireless antenna of one or both of the first networked device and the second networked device operates.

In some examples, modifying one or more wireless network configuration parameters of one or both of the first networked device and the second networked device additionally or alternatively involves modifying a configuration of active wireless antennas of one or more of the first networked device and the second networked device.

In some examples, modifying one or more wireless network configuration parameters of one or both of the first networked device and the second networked device additionally or alternatively involves powering off one or more wireless network interfaces of one or both of the first networked device and the second networked device.

In some examples, reconfiguring one or more operational parameters of one or both of the first networked device and the second networked device additionally or alternatively involves adjusting a threshold temperature at which one or both of the first networked device and second networked device reduce operating power.

In some examples, reconfiguring one or more operational parameters of one or both of the first networked device and the second networked device additionally or alternatively involves adjusting a time at which one or both of the first networked device and second networked device enter an idle-state after not playing media.

In some examples, the first networked device is configured to execute at least a first computing process and a second computing process, and wherein reconfiguring one or more operational parameters of one or both of the first networked device and the second networked device involves the first networked device (i) instructing the second networked device to execute the second computing process and (ii) in response to receiving confirmation that the second networked device has received the instruction, ceasing to execute the second computing process.

In some examples, the first networked device and the second networked device are members of a synchrony group where each of the first networked device and the second networked device are configured to play back media content in synchrony with each other. In these examples, the first networked device is configured to perform a master device function for the synchrony group. Further, reconfiguring one or more operational parameters of one or both of the first networked device and the second networked device involves (i) reconfiguring the second networked device to perform the master device function for the synchrony group, and (ii) reconfiguring the first networked device to perform a slave function in the synchrony group.

In some examples, reconfiguring one or more operational parameters of one or both of the first networked device and the second networked device additionally or alternatively involves modifying an amplifier output power of one or both of the first networked device and the second networked device.

In some examples, reconfiguring one or more operational parameters of one or both of the first networked device and the second networked device additionally or alternatively involves sending an instruction to a user to connect the first networked device and the second networked device via a wired communication connection.

BRIEF DESCRIPTION OF THE DRAWINGS

Features, aspects, and advantages of the presently disclosed technology may be better understood with regard to the following description, appended claims, and accompanying drawings where:

Figure 1:
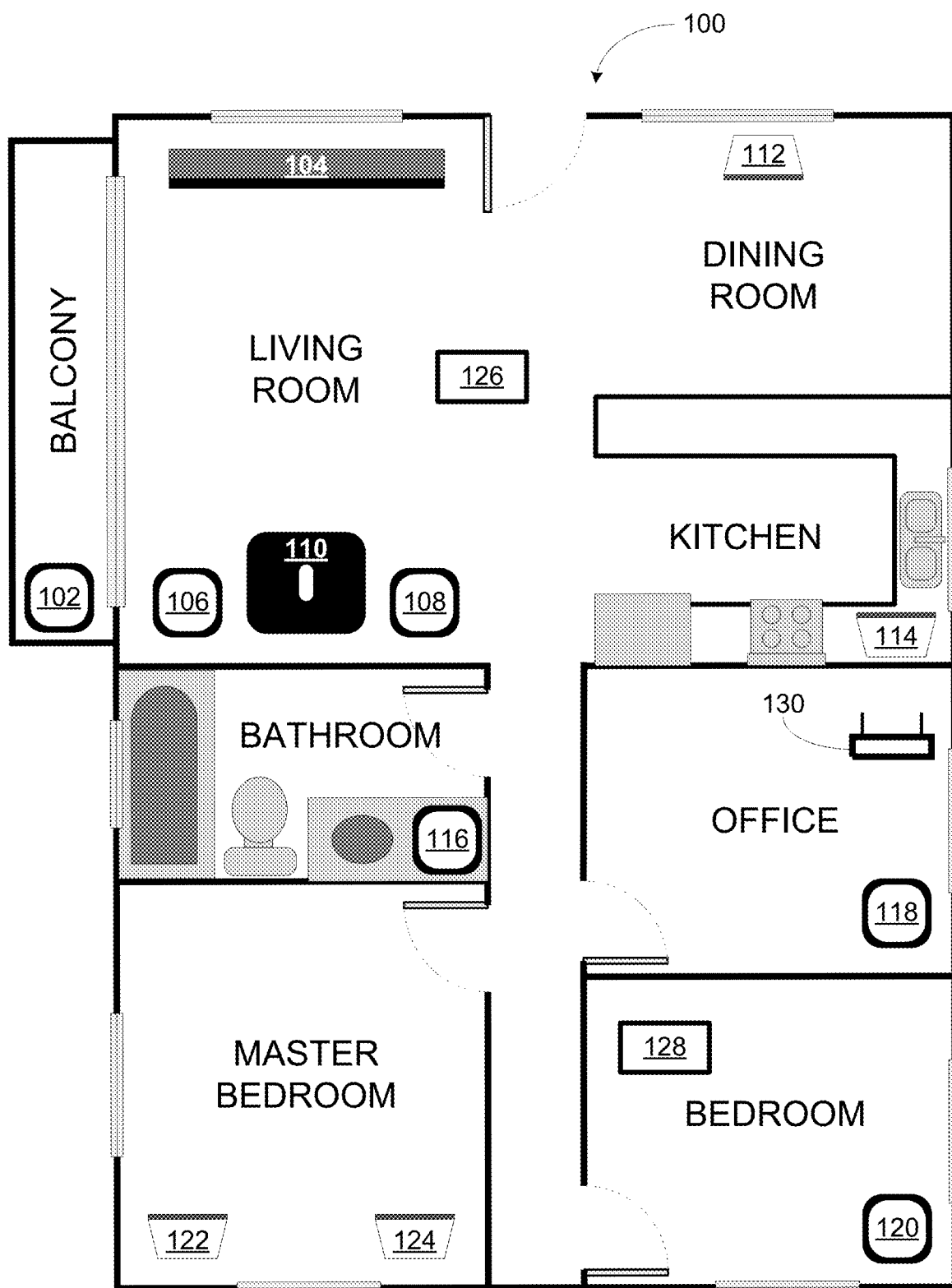
FIG. 1 shows an example media playback system configuration in which certain embodiments may be practiced.

The drawings are for the purpose of illustrating example embodiments, but it is understood that the inventions are not limited to the arrangements and instrumentalities shown in the drawings.

DETAILED DESCRIPTION

I. Overview

As mentioned above, this disclosure is related to systems and methods for reconfiguring operational parameters of two or more networked devices when their proximity causes performance issues. These networked devices may include any combination of voice enabled devices (VEDs), networked microphone devices (NMDs), playback devices (PBDs), and video playback devices (VPDs). The networked devices may include components such as processors, software components, memory, audio processing components, audio amplifiers, speakers, wireless/wired network interfaces, and in some cases microphones.

In some cases, users may stack networked devices on top of each other to save space and/or create a more aesthetically pleasing appearance. In other cases, users may place networked devices in physical contact next to one another. Stacking two or more networked devices on top of each other and/or placing them in physical contact with one another creates a proximity between the two or more networked devices. This proximity may cause performance issues including, but not limited to, (i) wireless connectivity issues (e.g., a saturated wireless signal and/or interference) and (ii) thermal operation issues (e.g., overheating of internal components).

To remedy these potential performance issues, when two or more networked devices determine a proximity to one another, they may reconfigure certain operational parameters to minimize any potential performance issues. These operational parameters may relate to the power supplied to certain internal components, how quickly the networked device enters an idle-state, and/or which networked devices handle particular processing tasks.

After and/or in response to determining that two or more networked device are in proximity to one another, at least one of the two or more networked devices may reconfigure one or more of the operational parameters based on existing configurations and relative positioning of the networked devices and whether a wired network connection exists between the two or more networked devices. For example, if a wired network connection exists between the two or more networked devices, one of the two or more networked devices may reconfigure wireless operational parameters, such as disabling a wireless antenna of the networked device. The existence of a wired network connection between the two or more networked devices allows for the disabling of a wireless antenna because the networked device with the disabled antenna can continue to receive wirelessly transmitted information via a networked device that still has an active antenna, through the wired network connection. In some cases, if a wired network connection does not exist, and if a determination is made that at least two of the two or more network devices are capable of wired network connections, a message may be sent to a controller used for configuring the two or more network devices to cause the controller to display a prompt to connect the at least two of the two or more network devices via a wired network connection.

Alternatively or additionally, one of the two or more networked devices may reconfigure operational parameters related to thermal properties of the two or more networked devices. For example, one of the two or more networked devices may reduce the power at which an audio amplifier of one or both of the networked devices operates. This may be beneficial by reducing operational temperatures of the network devices to prevent one or both of the networked devices from overheating when the devices are in close proximity.

In some embodiments, any of the two or more networked devices may manage the operational parameter configurations of itself and/or another network device. For example, a first networked device may manage one or more operational parameters of a second networked device by sending new configuration parameters via wired or wireless network interfaces of the first and second networked devices (e.g., Ethernet, Wi-Fi, Bluetooth™, etc). Alternatively or additionally, the first networked device may reconfigure one or more of its own operational parameters.

Further embodiments include tangible, non-transitory computer-readable media having stored thereon program instructions that, upon execution by a computing device, cause the computing device to perform the features and functions disclosed and described herein.

Some embodiments include a computing device comprising at least one processor, as well as data storage and program instructions. In operation, the program instructions are stored in the data storage, and upon execution by the at least one processor, cause the computing device (individually or in combination with other components or systems) to perform the features and functions disclosed and described herein.

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
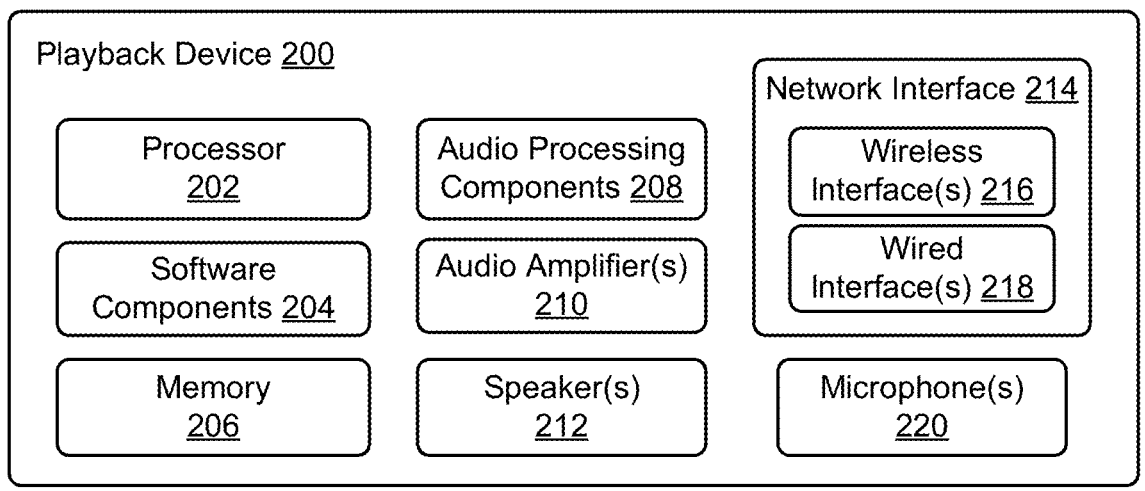
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include one or more processors 202, software components 204, memory 206, audio processing components 208, audio amplifier(s) 210, speaker(s) 212, a network interface 214 including wireless interface(s) 216 and wired interface(s) 218, and microphone(s) 220. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the one or more processors 202 may be one or more clock-driven computing components configured to process input data according to instructions stored in the memory 206. The memory 206 may be a tangible computer-readable medium configured to store instructions executable by the one or more processors 202. For instance, the memory 206 may be data storage that can be loaded with one or more of the software components 204 executable by the one or more processors 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the one or more processors 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. The playback device 200 may transmit metadata to and/or receive metadata from other devices on the network, including but not limited to components of the networked microphone system disclosed and described herein. In one example, the audio content and other signals (e.g., metadata and other signals) transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

The microphone(s) 220 may be arranged to detect sound in the environment of the playback device 200. For instance, the microphone(s) may be mounted on an exterior wall of a housing of the playback device. The microphone(s) may be any type of microphone now known or later developed such as a condenser microphone, electret condenser microphone, or a dynamic microphone. The microphone(s) may be sensitive to a portion of the frequency range of the speaker(s) 220. One or more of the speaker(s) 220 may operate in reverse as the microphone(s) 220. In some aspects, the playback device 200 might not have microphone(s) 220.

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, Sonos, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the Sonos product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render (e.g., play back) audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
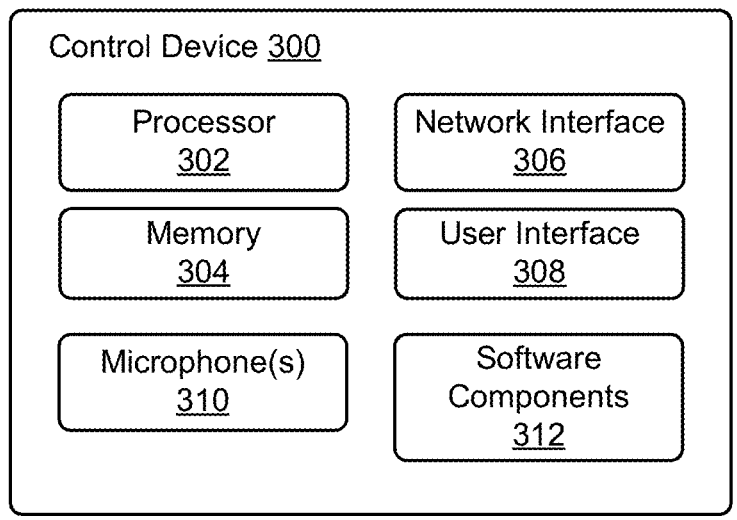
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include one or more processors 302, memory 304, a network interface 306, a user interface 308, microphone(s) 310, and software components 312. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The one or more processors 302 may be configured to perform functions relevant to facilitating user access, control, and configuration of the media playback system 100. The memory 304 may be data storage that can be loaded with one or more of the software components executable by the one or more processors 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 3G, 4G, or 5G mobile communication standards, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Control device 300 may include microphone(s) 310. Microphone(s) 310 may be arranged to detect sound in the environment of the control device 300. Microphone(s) 310 may be any type of microphone now known or later developed such as a condenser microphone, electret condenser microphone, or a dynamic microphone. The microphone(s) may be sensitive to a portion of a frequency range. Two or more microphones 310 may be arranged to capture location information of an audio source (e.g., voice, audible sound) and/or to assist in filtering background noise.

Figure 4:
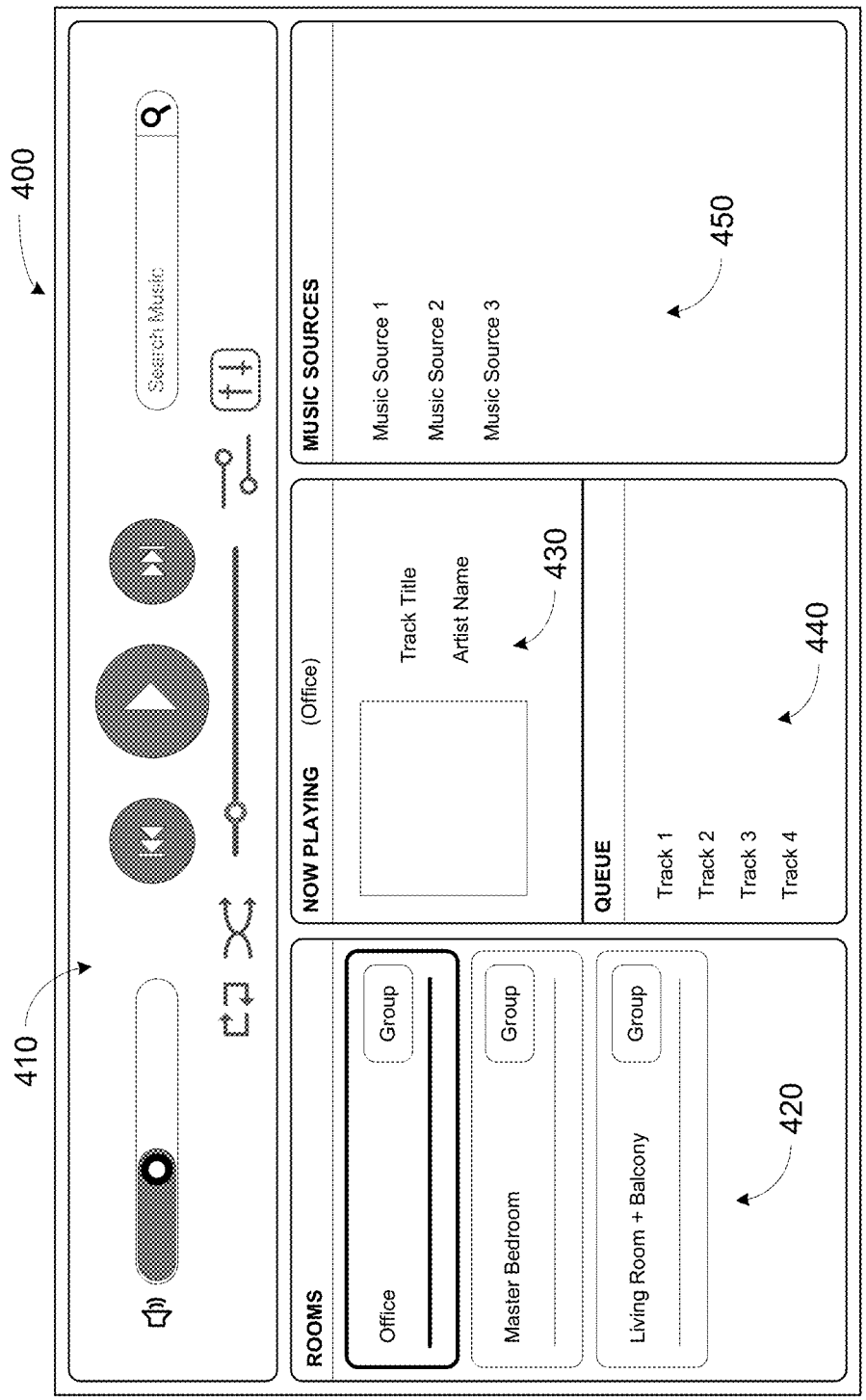
FIG. 4 shows an example controller interface.

The user interface 308 of the control device 300 may be configured to facilitate user access and control of the media playback system 100, by providing a controller interface such as the example controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone.

Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

e. Example Plurality of Networked Devices

Figure 5:
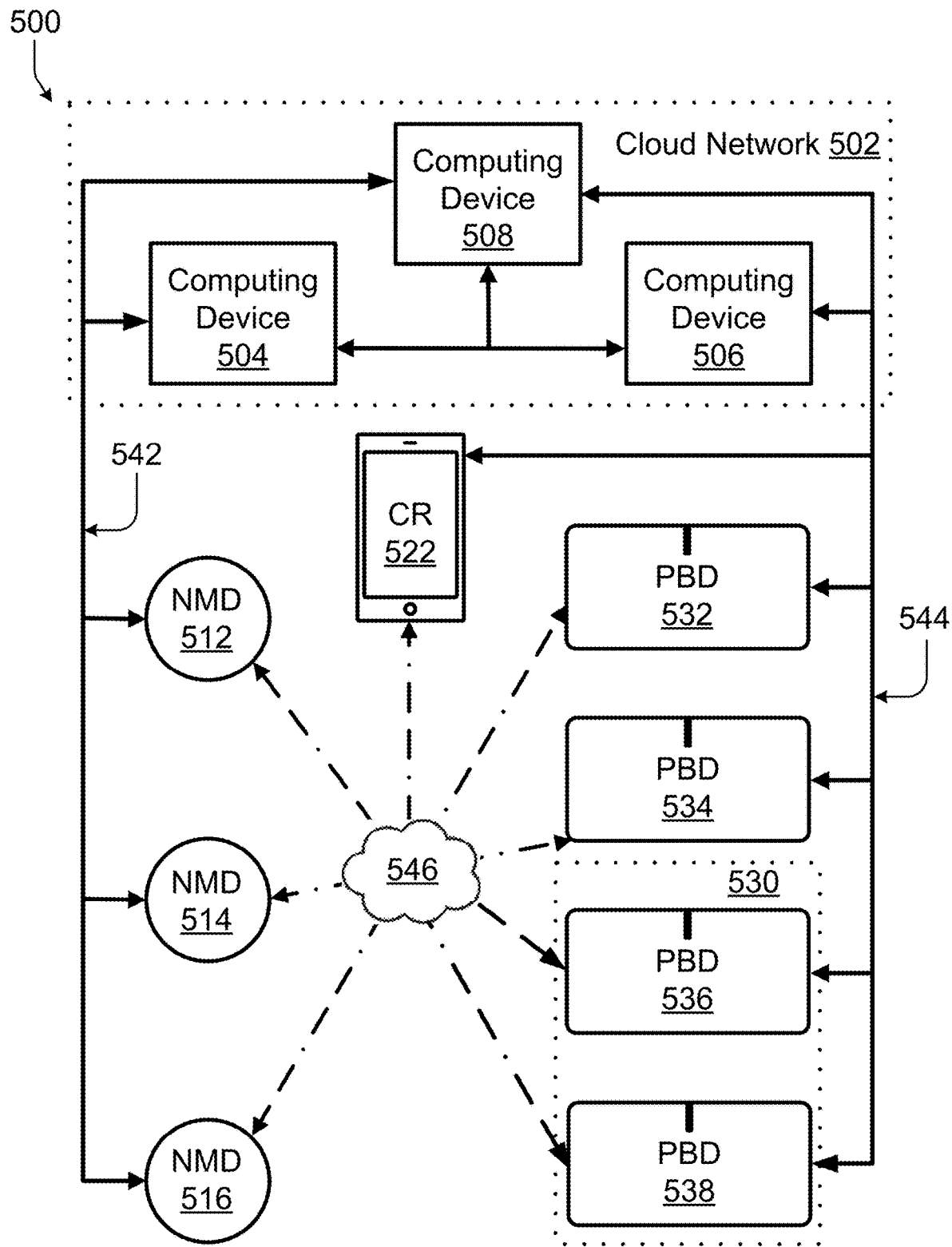
FIG. 5 shows an example plurality of network devices.

FIG. 5 shows an example plurality of devices 500 that may be configured to provide an audio playback experience, including but not limited to audio playback based on voice control. One having ordinary skill in the art will appreciate that the devices shown in FIG. 5 are for illustrative purposes only, and variations including different and/or additional (or fewer) devices may be possible. As shown, the plurality of devices 500 includes computing devices 504, 506, and 508; network microphone devices (NMDs) 512, 514, and 516; playback devices (PBDs) 532, 534, 536, and 538; and a controller device (CR) 522.

Each of the plurality of devices 500 may be network-capable devices that can establish communication with one or more other devices in the plurality of devices according to one or more network protocols, such as NFC, Bluetooth™, Ethernet, and IEEE 802.11, among other examples, over one or more types of networks, such as wide area networks (WAN), local area networks (LAN), and personal area networks (PAN), among other possibilities.

As shown, the computing devices 504, 506, and 508 may be part of a cloud network 502. The cloud network 502 may include additional computing devices. In one example, the computing devices 504, 506, and 508 may be different servers. In another example, two or more of the computing devices 504, 506, and 508 may be modules of a single server. Analogously, each of the computing device 504, 506, and 508 may include one or more modules or servers. For ease of illustration purposes herein, each of the computing devices 504, 506, and 508 may be configured to perform particular functions within the cloud network 502. For instance, computing device 508 may be a source of audio content for a streaming music service.

As shown, the computing device 504 may be configured to interface with NMDs 512, 514, and 516 via communication path 542. NMDs 512, 514, and 516 may be components of one or more "Smart Home" systems. In one case, NMDs 512, 514, and 516 may be physically distributed throughout a household, similar to the distribution of devices shown in FIG. 1. In another case, two or more of the NMDs 512, 514, and 516 may be physically positioned within relative close proximity of one another. Communication path 542 may comprise one or more types of networks, such as a WAN including the Internet, LAN, and/or PAN, among other possibilities.

In one example, one or more of the NMDs 512, 514, and 516 may be devices configured primarily for audio detection. In another example, one or more of the NMDs 512, 514, and 516 may be components of devices having various primary utilities. For instance, as discussed above in connection to FIGS. 2 and 3, one or more of NMDs 512, 514, and 516 may be (or at least may include or be a component of) the microphone(s) 220 of playback device 200 or the microphone(s) 310 of network device 300. Further, in some cases, one or more of NMDs 512, 514, and 516 may be (or at least may include or be a component of) the playback device 200 or network device 300. In an example, one or more of NMDs 512, 514, and/or 516 may include multiple microphones arranged in a microphone array. In some embodiments, one or more of NMDs 512, 514, and/or 516 may be a microphone on a mobile computing device (e.g., a smartphone, tablet, or other computing device).

As shown, the computing device 506 may be configured to interface with CR 522 and PBDs 532, 534, 536, and 538 via communication path 544. In one example, CR 522 may be a network device such as the network device 200 of FIG. 2. Accordingly, CR 522 may be configured to provide the controller interface 400 of FIG. 4. Similarly, PBDs 532, 534, 536, and 538 may be playback devices such as the playback device 300 of FIG. 3. As such, PBDs 532, 534, 536, and 538 may be physically distributed throughout a household as shown in FIG. 1. For illustration purposes, PBDs 536 and 538 may be part of a bonded zone 530, while PBDs 532 and 534 may be part of their own respective zones. As described above, the PBDs 532, 534, 536, and 538 may be dynamically bonded, grouped, unbonded, and ungrouped. Communication path 544 may comprise one or more types of networks, such as a WAN including the Internet, LAN, and/or PAN, among other possibilities.

In one example, as with NMDs 512, 514, and 516, CR 522 and PBDs 532, 534, 536, and 538 may also be components of one or more "Smart Home" systems. In one case, PBDs 532, 534, 536, and 538 may be distributed throughout the same household as the NMDs 512, 514, and 516. Further, as suggested above, one or more of PBDs 532, 534, 536, and 538 may be one or more of NMDs 512, 514, and 516.

The NMDs 512, 514, and 516 may be part of a local area network, and the communication path 542 may include an access point that links the local area network of the NMDs 512, 514, and 516 to the computing device 504 over a WAN (communication path not shown). Likewise, each of the NMDs 512, 514, and 516 may communicate with each other via such an access point.

Similarly, CR 522 and PBDs 532, 534, 536, and 538 may be part of a local area network and/or a local playback network as discussed in previous sections, and the communication path 544 may include an access point that links the local area network and/or local playback network of CR 522 and PBDs 532, 534, 536, and 538 to the computing device 506 over a WAN. As such, each of the CR 522 and PBDs 532, 534, 536, and 538 may also communicate with each over such an access point.

In one example, communication paths 542 and 544 may comprise the same access point. In an example, each of the NMDs 512, 514, and 516, CR 522, and PBDs 532, 534, 536, and 538 may access the cloud network 502 via the same access point for a household.

As shown in FIG. 5, each of the NMDs 512, 514, and 516, CR 522, and PBDs 532, 534, 536, and 538 may also directly communicate with one or more of the other devices via communication means 546. Communication means 546 as described herein may involve one or more forms of communication between the devices, according to one or more network protocols, over one or more types of networks, and/or may involve communication via one or more other network devices. For instance, communication means 546 may include one or more of for example, Bluetooth™ (IEEE 802.15), NFC, Wireless direct, and/or Proprietary wireless, among other possibilities.

In one example, CR 522 may communicate with NMD 512 over Bluetooth™, and communicate with PBD 534 over another local area network. In another example, NMD 514 may communicate with CR 522 over another local area network, and communicate with PBD 536 over Bluetooth™. In a further example, each of the PBDs 532, 534, 536, and 538 may communicate with each other according to a spanning tree protocol over a local playback network, while each communicating with CR 522 over a local area network, different from the local playback network. Other examples are also possible.

In some cases, communication means between the NMDs 512, 514, and 516, CR 522, and PBDs 532, 534, 536, and 538 may change depending on types of communication between the devices, network conditions, and/or latency demands. For instance, communication means 546 may be used when NMD 516 is first introduced to the household with the PBDs 532, 534, 536, and 538. In one case, the NMD 516 may transmit identification information corresponding to the NMD 516 to PBD 538 via NFC, and PBD 538 may in response, transmit local area network information to NMD 516 via NFC (or some other form of communication). However, once NMD 516 has been configured within the household, communication means between NMD 516 and PBD 538 may change. For instance, NMD 516 may subsequently communicate with PBD 538 via communication path 542, the cloud network 502, and communication path 544. In another example, the NMDs and PBDs may never communicate via local communications means 546. In a further example, the NMDs and PBDs may communicate primarily via local communications means 546. Other examples are also possible.

In an illustrative example, NMDs 512, 514, and 516 may be configured to receive voice inputs to control PBDs 532, 534, 536, and 538. The available control commands may include any media playback system controls previously discussed, such as playback volume control, playback transport controls, music source selection, and grouping, among other possibilities. In one instance, NMD 512 may receive a voice input to control one or more of the PBDs 532, 534, 536, and 538. In response to receiving the voice input, NMD 512 may transmit via communication path 542, the voice input to computing device 504 for processing. In one example, the computing device 504 may convert the voice input to an equivalent text command, and parse the text command to identify a command. Computing device 504 may then subsequently transmit the text command to the computing device 506, and computing device 506 in turn may then control one or more of PBDs 532-538 to execute the command. In another example, the computing device 504 may convert the voice input to an equivalent text command, and then subsequently transmit the text command to the computing device 506. The computing device 506 may then parse the text command to identify one or more playback commands, and then computing device 506 may additionally control one or more of PBDs 532-538 to execute the command.

For instance, if the text command is "Play 'Track 1' by 'Artist 1' from 'Streaming Service 1' in 'Zone 1'," The computing device 506 may identify (i) a URL for "Track 1" by "Artist 1" available from "Streaming Service 1," and (ii) at least one playback device in "Zone 1." In this example, the URL for "Track 1" by "Artist 1" from "Streaming Service 1" may be a URL pointing to computing device 508, and "Zone 1" may be the bonded zone 530. As such, upon identifying the URL and one or both of PBDs 536 and 538, the computing device 506 may transmit via communication path 544 to one or both of PBDs 536 and 538, the identified URL for playback. One or both of PBDs 536 and 538 may responsively retrieve audio content from the computing device 508 according to the received URL, and begin playing "Track 1" by "Artist 1" from "Streaming Service 1."

One having ordinary skill in the art will appreciate that the above is just one illustrative example, and that other implementations are also possible. In one case, operations performed by one or more of the plurality of devices 500, as described above, may be performed by one or more other devices in the plurality of device 500. For instance, the conversion from voice input to the text command may be alternatively, partially, or wholly performed by another device or devices, such as CR 522, NMD 512, computing device 506, PBD 536, and/or PBD 538. Analogously, the identification of the URL may be alternatively, partially, or wholly performed by another device or devices, such as NMD 512, computing device 504, PBD 536, and/or PBD 538.

f. Example Network Microphone Device

Figure 6:
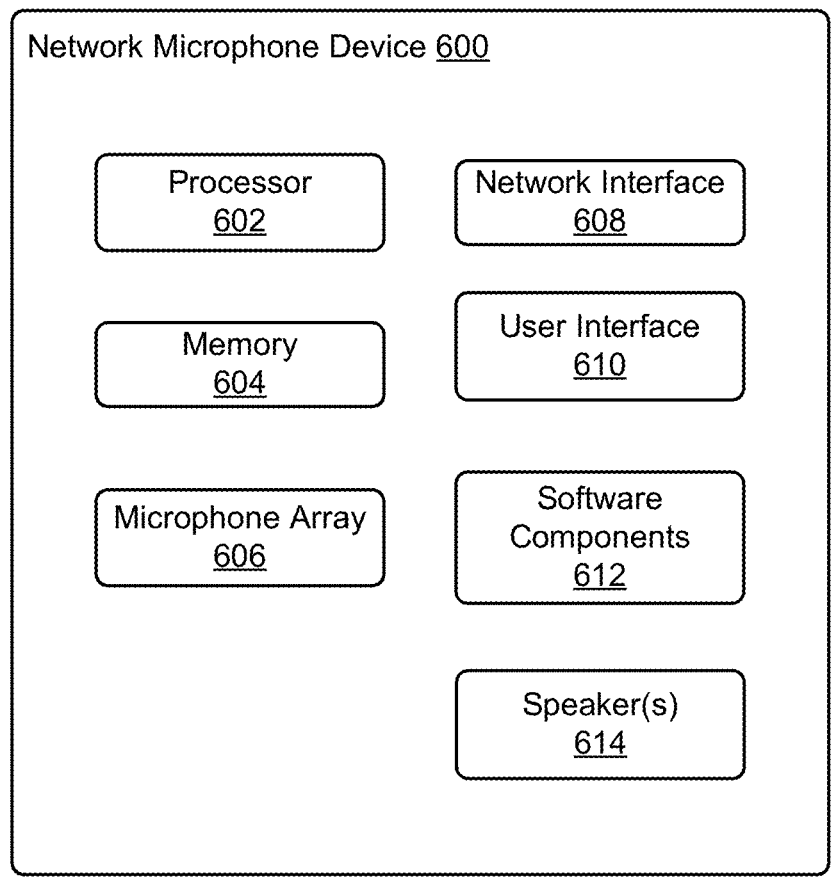
FIG. 6 shows a function block diagram of an example network microphone device.

FIG. 6 shows a function block diagram of an example network microphone device 600 that may be configured to be one or more of NMDs 512, 514, and 516 of FIG. 5. As shown, the network microphone device 600 includes one or more processors 602, memory 604, a microphone array 606 (e.g., one or more microphones), a network interface 608, a user interface 610, software components 612, and speaker(s) 614. One having ordinary skill in the art will appreciate that other network microphone device configurations and arrangements are also possible. For instance, network microphone devices may alternatively exclude the speaker(s) 614 or have a single microphone instead of microphone array 606.

The one or more processors 602 may include one or more processors and/or controllers, which may take the form of a general or special-purpose processor or controller. For instance, the one or more processors 602 may include microprocessors, microcontrollers, application-specific integrated circuits, digital signal processors, and the like. The memory 604 may be data storage that can be loaded with one or more of the software components executable by the one or more processors 602 to perform those functions. Accordingly, memory 604 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, and/or an optical-storage device, among other possibilities.

The microphone array 606 may be a plurality of microphones arranged to detect sound in the environment of the network microphone device 600. Microphone array 606 may include any type of microphone now known or later developed such as a condenser microphone, electret condenser microphone, or a dynamic microphone, among other possibilities. In one example, the microphone array may be arranged to detect audio from one or more directions relative to the network microphone device. The microphone array 606 may be sensitive to a portion of a frequency range. In one example, a first subset of the microphone array 606 may be sensitive to a first frequency range, while a second subset of the microphone array may be sensitive to a second frequency range. The microphone array 606 may further be arranged to capture location information of an audio source (e.g., voice, audible sound) and/or to assist in filtering background noise. Notably, in some embodiments the microphone array may consist of only a single microphone, rather than a plurality of microphones.

The network interface 608 may be configured to facilitate wireless and/or wired communication between various network devices, such as, in reference to FIG. 5, CR 522, PBDs 532-538, computing devices 504-508 in cloud network 502, and other network microphone devices, among other possibilities. As such, network interface 608 may take any suitable form for carrying out these functions, examples of which may include an Ethernet interface, a serial bus interface (e.g., FireWire, USB 2.0, etc.), a chipset and antenna adapted to facilitate wireless communication, and/or any other interface that provides for wired and/or wireless communication. In one example, the network interface 608 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on).

The user interface 610 of the network microphone device 600 may be configured to facilitate user interactions with the network microphone device. In one example, the user interface 610 may include one or more of physical buttons, graphical interfaces provided on touch sensitive screen(s) and/or surface(s), among other possibilities, for a user to directly provide input to the network microphone device 600. The user interface 610 may further include one or more of lights and the speaker(s) 614 to provide visual and/or audio feedback to a user. In one example, the network microphone device 600 may further be configured to playback audio content via the speaker(s) 614.

III. Example Systems and Methods for Proximal Networked Devices

It may be desirable in some instances for a networked device to determine its proximity to another networked device and reconfigure one or more of its operational parameters in response to the proximity determination. In some circumstances, users may stack networked devices on top of each other or otherwise position network devices within close proximities to one another. Such close proximities may cause performance issues, including, but are not limited to, (i) wireless connectivity issues and (ii) thermal property issues. To address these potential issues, in some examples, the networked device may determine that it is in proximity to another networked device and reconfigure one or more operational parameters of its own and/or one or more operational parameters of the other networked device. This may be beneficial because the networked device might not be operating at a high efficiency/effectiveness due to the proximity-caused performance issues while in proximity to another networked device, or the networked device might not be performing or operating as well as it would otherwise be performing or operating if it were not in proximity to another networked device. For instance, if a user stacks a first networked device on top of a second networked device, both networked devices may suffer from wireless connectivity problems. This occurs because both networked devices emit wireless signals, and a wireless signal transmitted from the first networked device may saturate or interfere with a wireless receiver of the second networked device (and vice versa). In this scenario, the first networked device may determine it is in close proximity with the second networked device and modify its wireless operation to account for the wireless signal of the second networked device.

It may be further desirable for a first networked device in a system of multiple networked devices to determine its proximity to a second networked device and cause the second network device to reconfigure one or more operational parameters of the second networked device in response to the proximity determination. The first networked device may cause the second network device to reconfigure one or more operational parameters of the second networked device (i) locally, via a local-area-network (LAN), and/or (ii) remotely, via a cloud-server. For example, the first networked device may determine it is in proximity to the second networked device then send configuration parameters to the second networked device via a LAN (e.g., wired and/or wireless connection). In another example, the first networked device may determine it is in proximity to the second networked device then send configuration parameters to the second networked device via a cloud-server. In this example, the second networked device may retrieve the configuration parameters and reconfigure its parameters accordingly. In other example embodiments, the first networked device may send the proximity determination to a cloud computing system, and in turn, the cloud computing system may return configuration parameters to the first and second networked devices. In such example embodiments, the cloud computing system may send different configuration parameters to the first and second networked devices. The specific configuration parameters may depend on the proximity determination (e.g., whether the devices are stacked and/or in physical contact with one another) and other variables (i.e. configurations, operational states, processing capabilities, etc.) corresponding to the respective network devices.

Figure 7:
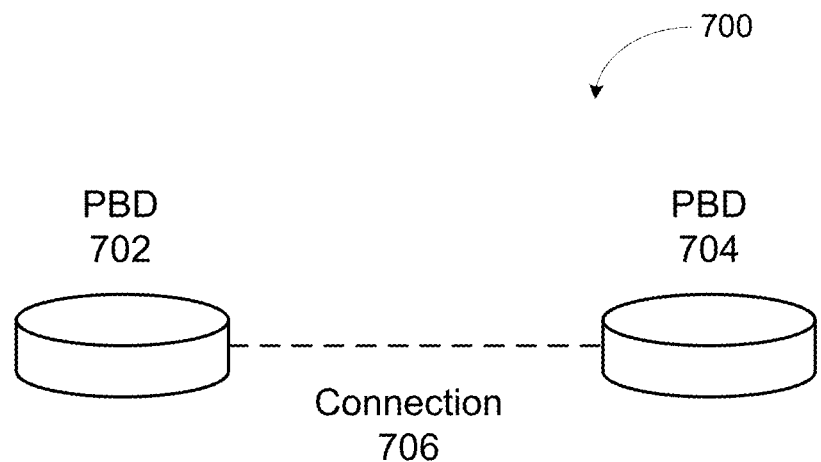
FIG. 7 shows an example networked device configuration in which certain embodiments may be practiced.

FIG. 7 shows a media playback configuration 700, according to example embodiments. Media playback configuration 700 includes PBDs 702 and 704. PBDs 702 and 704 may be connected via connection 706. Connection 706 may be a wired connection (e.g. Ethernet), a wireless connection (e.g. WiFi), and/or any other communication link now known or later developed. PBDs 702 and 704 are configured to operate in a similar fashion as PBDs 532, 534, 536, and 538, as described in FIG. 5. In operation, PBDs 702 and 704 are configured to play audio content and output system responses. Additionally, in some embodiments, PBDs 702 and 704 are equipped with various sensors, including but not limited to, proximity and orientation sensors.

In some examples, PBDs 702 and 704 may be in a configuration in which they are not in proximity to one another, as shown in FIG. 7. In this configuration, PBDs 702 and 704 may not experience wireless or thermal issues caused by being in proximity to each other. For example, PBDs 702 and 704 may be operating normally, with no interference from one another. Media playback configuration 700 may represent ideal placement of PBDs 702 and 704.

However, in some circumstances, users place PBDs 702 and 704 in proximity to one another through stacking them on top of each other or placing them side-by-side to each other, or in other configurations where PBDs 702 and 704 are in proximity to or in physical contact with one another. This stacking and/or placement may cause one or both of PBDs 702 and/or 704 to experience wireless and/or thermal performance issues, as described previously.

Figure 8:
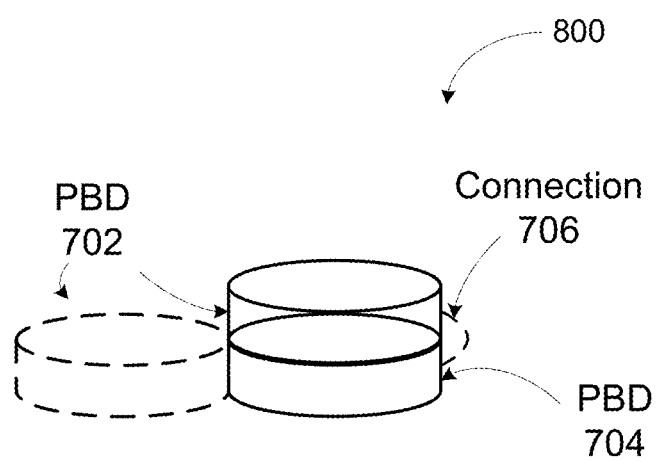
FIG. 8 shows an example networked device configuration in which certain embodiments may be practiced.

FIG. 8 shows a media playback configuration 800, according to example embodiments. Similar to media playback configuration 700 shown in FIG. 7, media playback configuration 800 includes PBDs 702 and 704, connected by a connection 706. In some embodiments, the connection 706 may be a wired connection (e.g. Ethernet), a wireless connection (e.g. WiFi), and/or any other communication link now known or later developed. For illustrative purposes, in media playback configuration 800, PBDs 702 and 704 are in proximity with one another.

In some circumstances, a user may stack PBD 702 on top of PBD 704. This may cause PBD 702 and/or PBD 704 to experience one or more of the problems described herein with wireless connectivity or thermal performance. To overcome these potential problems, in some examples, PBD 702 may determine a proximity to PBD 704, determine whether there is a wired network connection existing between PBD 702 and 704, and in response to determining the proximity and existence of a wired network connection, reconfigure one or more operational parameters of one or both of PBDs 702 and 704. For example, PBD 702 may detect that PBD 704 is underneath PBD 702 using various sensors. PBD 702 may then determine that connection 706 includes a wired connection. In response to these determinations, PBD 702 may then cause PBD 704 to reconfigure one or more operational parameters of PBD 704, such as disabling the wireless antenna of PBD 704, or at least the transmitter associated therewith. This may be beneficial because it allows PBD 702 to receive and transmit wireless signals without interference from a similar wireless signal emanating from PBD 704. In operation, PBD 702 may receive wireless signals addressed to PBD 704 and transmit those signals through the wired connection of connection 706 to PBD 704.

a. Example Determination of Proximity

In some examples, determining a proximity of PBD 702 and PBD 704 involves comparing a current radio signature of PBD 702 with an expected radio signature for PBD 702. In these examples, PBD 702 has an expected radio signature (e.g., a radio signature measured with no interference present) and a current radio signature (e.g., the radio signal measured while in media playback configuration 800). PBD 702 may then determine its proximity by comparing the current operating radio signature with its expected radio signature. For example, PBD 702 may have an expected radio signature, which was measured in test conditions (e.g., no other devices or wireless signals). If a user stacks PBD 704 on top of PBD 702, the current radio signature of PBD 702 may exhibit interference in the form of signal saturation. PBD 702 compares the current radio signature to the expected radio signature, and if the current radio signature is different from the expected radio signature, the PBD 702 may conclude that it is in close proximity with another networked device comprising a wireless transmitter, e.g., PBD 704. In some embodiments, PBD 702 may conclude that it is in close proximity to another networked device with an active wireless transmitter, e.g., PBD 704 if the current radio signature differs from the expected radio signature by a sufficient threshold amount.

In some examples, determining a proximity of PBD 702 and PBD 704 additionally or alternatively involves determining the proximity between PBD 702 and 704 based on a Bluetooth™ connection between PBD 702 and 704. In one example implementation, determining that PBD 702 and PBD 704 are within a proximity of each other may involve determining that a received signal strength indication (RSSI) of the Bluetooth™ connection between PBD 702 and 704 is above a threshold strength. For example, a user may stack PBD 704 on top of PBD 702. To determine a proximity between PBDs 702 and 704, PBD 702 may assess the RSSI of the Bluetooth™ connection between PBDs 702 and 704. If the RSSI is above a certain threshold (e.g. 70/100), PBD 702 may conclude that PBD 702 in close proximity to PBD 704. In some embodiments, the threshold is configurable and may depend on the type of playback device(s) corresponding to PBDs 702 and 704. In one example, if PBD 702 is an amplifier, the threshold level may be 70/100. In another example, if PBD 702 is a subwoofer, the threshold level may be 80/100. One having ordinary skill in the art will appreciate that other communication protocols may also be utilized to determine proximity. Under some communication protocols, information indicating proximity between transmitters and receivers may be incorporated in the data sent and received according to the communication protocols.

In some circumstances, PBDs 702 and 704 may experience interference with their respective wireless and/or Bluetooth™ receivers. In such cases, other proximity sensors on either or both of PBD 702 and PBD 704 may be utilized to determine proximity. For instance, PBD 702 and/or PBD 704 may have microphones (for voice input) and/or capacitive touch sensors (for touch controls) that may be used for determining their respective operating environments. Other examples are also possible.

In some examples, determining a proximity of PBD 702 and PBD 704 involves determining whether a proximity sensor on PBD 702 detects the presence of PBD 704. For example, a user may stack PBD 704 on top of PBD 702. PBD 702 may determine a proximity to PBD 704 using one or more sensors on PBD 702, such that the one or more sensors may be activated when PBD 704 is positioned immediately above PBD 702, thereby indicating that PBD 704 is in close proximity to PBD 702.

In some examples, determining a proximity of PBD 702 and PBD 704 additionally or alternatively involves determining whether PBDs 702 and 704 are within a threshold distance using a near-field communication (NFC) protocol. In these examples, if a user stacks PBD 704 on top of PBD 702, one or both of PBDs 702 and 704 can detect a proximity of the other through NFC. As with the proximity sensors described above, this may be beneficial because it allows PBDs 702 and 704 to determine a proximity without relying on wireless and/or Bluetooth™ receivers.

One having ordinary skill in the art will appreciate that in some embodiments, one or more of the above examples may be implemented to conclude that PBDs 702 and 704 are within a close proximity. For instance, the one or more sensors on PBD 702 may be used to determine that some device is positioned immediately above PBD 702, after which RSSIs may be used to identify which device is positioned immediately above PBD 702. Other examples are also possible.

In some examples, determining a proximity of PBD 702 and PBD 704 additionally or alternatively involves receiving, by PBD 702, a message indicating PBD 704 is in proximity to PBD 702. The message indicating PBD 704 is in proximity to PBD 702 may originate from (i) another networked device located in media playback configuration 800 (e.g., PBD 704 and/or another device not shown), or (ii) a cloud-server.

In one example, PBD 702 may additionally or alternatively determine a proximity to PBD 704 by receiving a message indicating proximity from another networked device located in media playback configuration 800. PBD 704 and/or another networked device may determine a proximity and send the determination to all or some of the networked devices in media playback configuration 800. This may be beneficial if one or more of PBDs 702 and 704 are unable to determine a proximity to the other PBD. For example, PBD 702 may be stacked on top of PBD 704, as shown in FIG. 8. While, PBD 702 may not experience much wireless signal degradation because it is located on top of PBD 704, PBD 704 may experience wireless signal degradation because it is below PBD 702. In this situation it may be beneficial for PBD 704 to communicate the proximity determination to PBD 702 to allow or perhaps cause PBD 702 to reconfigure its operational parameters to eliminate or at least reduce the interference affecting PBD 704, or perhaps to cause PBDs 702 and 704 to each reconfigure one or more operational parameters to address the signal degradation experienced by PBD 704, for example, by shutting off PBD 704's wireless transceiver and configuring PBD 702 to transmit/receive wireless transmissions addressed to/from PBD 704 via a wired connection of connection 706.

Similarly, because heat rises, PBD 704 may not experience a potentially performance-impacting temperature increase because it is below PBD 702, whereas PBD 702 may experience a potentially performance-impacting temperature increase because of the heat rising from PBD 704. In this situation, it may be beneficial for PBD 702 to communicate the proximity determination to PBD 704 to allow or perhaps cause PBD 704 to reconfigure one or more of its operational parameters to eliminate or at least ameliorate a potential (or actual) performance-impacting temperature increase.

In another example, PBD 702 may determine a proximity to PBD 704 by receiving a message indicating proximity from a cloud-server. In operation, PBDs 702 and 704 may be communicating wireless and thermal information to a cloud-server for processing and analysis. After processing the information, the cloud-server (i) determines whether PBDs 702 and 704 are in close proximity to one another, and (ii) if it determines there is a close proximity, sends the determination to one or both of PBDs 702 and 704. Once PBDs 702 and 704 receive the determination from cloud-server, PBD 702 and/or 704 may reconfigure one or both of PBDs 702 and 704's operational parameters.

In some examples, determining a proximity of PBD 702 and PBD 704 additionally or alternatively involves determining whether an orientation sensor on PBD 702 indicates or at least suggests that PBDs 702 and 704 are in a stacked configuration versus a side-by-side configuration.

For example, if a first networked device may determine that it is in close proximity to a second networked device based on one or more of the wireless, thermal, or other proximity detection methods described herein, and if the orientation sensor of the first networked device indicates that the first networked device is in a horizontal position, then the first network device may conclude that the first networked device and the second networked device are in a stacked configuration. Similarly, if the first networked device determines that it is in proximity to the second networked device based on one or more of the wireless, thermal, or other proximity detection methods described herein, and if the orientation sensor of the first networked device indicates that the first networked device is in a vertical position, then the first network device may conclude that the first networked device and the second networked device are in a side-by-side configuration.

In another example, if the first networked device determines that it is in close proximity to the second networked device based on one or more of the wireless, thermal, or other proximity detection methods described herein, and if the measured thermal and/or wireless impact of the second networked device is above a threshold and the orientation sensor of the first networked device indicates that the first networked device is in a horizontal orientation, then the first networked device may conclude that the first networked device and the second networked device are in a stacked configuration. Similarly, if the first networked device determines that it is in close proximity to the second networked device based on one or more of the wireless, thermal, or other proximity detection methods described herein, and if the measured thermal and/or wireless impact of the second networked device is below a threshold even though the orientation sensor of the first networked device indicates that the first networked device is in a horizontal orientation, then the first networked device may conclude that the first networked device and the second networked device are in a side-by-side configuration. One of ordinary skill in the art will appreciate that other examples and permutations of relative positions between PBDs 702 and 704 are also possible, and that different combinations of determined proximities and orientations may be based upon to identify the different relative positions.

In some examples, determining a proximity of PBD 702 and PBD 704 additionally or alternatively involves receiving an input from a user indicating PBDs 702 and 704 are in close proximity to each other. It may be beneficial for PBD 702 to receive the proximity determination from a user because the user may be the one who set up PBDs 702 and 704 in the stacked media playback configuration 800. In operation, a user may physically place PBDs 702 and 704 in desired locations throughout a listening area. After physically placing PBDs 702 and 704, the user may indicate via a control device (e.g., such as control device 300) that PBDs 702 and 704 are in close proximity. In some examples, the control device may prompt the user to indicate a proximity of PBDs 702 and 704 at some time during the configuration process. In some embodiments, the proximity indication received from a user may also specify whether the devices are in a stacked or side-by-side arrangement.

In some examples, determining a proximity of PBD 702 and PBD 704 may additionally or alternatively involve PBDs 702 and/or 704 prompting a user to initiate a diagnostic process based on one or more of the wireless, thermal, or other proximity detection methods described herein. For example, PBD 702 may compare a current radio signature to the expected radio signature and determine interference exists. Then, based on determining a discrepancy between the radio signatures, PBD 702 may prompt a user to run a diagnostic process. The diagnostic process may involve PBD 702 (*i*) turning on/off components, and/or (ii) sending signals to PBD 704 and/or another playback device at various strengths, channels, or frequencies to determine a proximity between PBD 702, PBD 704, and/or another playback device not shown in FIG. 8. In some examples, PBD 702 may prompt the user to indicate whether PBD 702 is in a close proximity to another device, and further in some cases, prompt the user to indicate which device is in close proximity to PBD 702 and/or how they are positioned relative to each other.

In some examples, determining a proximity of PBD 702 and PBD 704 additionally or alternatively involves PBDs 702 and/or 704 initiating a diagnostic protocol in response to an initialization of and/or change to media playback configuration 700. For example, a user may initialize media playback configuration 700 by placing, turning on, and configuring PBDs 702 and 704. In response to this initialization, PBD 702 may initiate the diagnostic process described above to determine a proximity of PBDs 702 and 704. In another example, a user may add an additional playback device to media playback configuration 700. PBD 702 may then initiate the diagnostic process to determine whether the newly added playback device is in close proximity to either or both of PBDs 702 and 704.

b. Example Determination of Wired Connection

One challenge with playback systems that contain PBDs in a stacked configuration is determining which operational parameter to reconfigure after determining a proximity between the PBDs. To address this challenge, after PBDs 702 and/or 704 determine there is a close proximity between each other, PBDs 702 and 704 may determine whether there is a wired network connection existing between PBDs 702 and 704 via connection 706. In some embodiments, connection 706 comprises a wired connection (e.g. Ethernet), a wireless connection (e.g. WiFi) and/or any other type of communication link now known or later developed. The existence of a wired network connection between PBDs 702 and 704 allows the PBDs 702 and 704 to communicate information via the wired network connection, which in turn allows the PBDs 702 and 704 to reconfigure additional operational parameters. For example, if a user stacks PBDs 702 and 704 on top of one another and a wired network connection exists between PBDs 702 and 704, PBD 702, at least in some embodiments, may cause PBD 704 to disable the wireless antenna of PBD 704 and subsequently begin to forward data addressed to PBD 704 via the wired connection of connection 706.

In some examples, determining whether a wired network connection exists between PBDs 702 and 704 involves determining whether PBDs 702 and 704 are connected via a wired network interface (e.g., Ethernet port). PBD 702 may determine that it is connected to PBD 704 via a wired network interface by querying PBD 704 through PBD 704's wired network interface. In operation, PBD 702 may query the wired network interface of PBD 704 by attempting to connect to the wired network interface of PBD 704. If the attempt to connect is successful, PBD 702 may conclude that it is connected to PBD 704 via the wired network interface.

In some cases, the existence of a wired network connection may facilitate the determination of a close proximity between PBDs 702 and 704. For example, in some configurations, PBDs 702 and 704 are likely in proximity with one another when connection 706 between PBDs 702 and 704 includes a wired connection. For example, in some embodiments, PBD 702 may additionally or alternatively conclude that it is in proximity to PBD 704 based on a received power level at its network interface, where a higher received power level (e.g., above a certain threshold) suggests that PBD 702 and PBD 704 are connected via a short cable, and a lower received power level (e.g., below a certain threshold) suggests that PBD 702 and PBD 704 are connected via a long cable.

Additionally, the existence of a wired network connection may prompt one or both of PBDs 702 and 704 to determine whether PBDs 702 and 704 are in proximity to each other. For example, since a wired network connection can indicate a likelihood of proximity between PBDs 702 and 704, PBDs 702 and 704 may determine whether a close proximity exists between PBDs 702 and 704 in response to the transmission of information via the wired network connection between PBDs 702 and 704.

Further, in the case a wired network connection does not exist between PBDs 702 and 704, and a determination is made that PBDs 702 and 704 are both capable of a wired network connection, a message may be sent to a controller used by a user to configure and/or control the PBDs 702 and 704, to prompt the user to connect PBDs 702 and 704 via a wired network connection. Thereafter, a determination may be made that a wired network connection exists between PBDs 702 and 704.

c. Example Reconfiguration of Operational Parameters

After determining a proximity of PBDs 702 and 704 and determining whether there is a wired network connection existing between PBDs 702 and 704, PBDs 702 and/or 704 may reconfigure one or more operational parameters of one or both of PBDs 702 and 704. This may be beneficial when PBDs 702 and/or 704 are experiencing wireless or thermal problems caused by their proximity to one another because it allows PBDs 702 and/or 704 to reconfigure (and even dynamically reconfigure) their respective operational parameters in response to detecting the wireless or thermal problems.

In some examples, reconfiguring one or more operational parameters of PBDs 702 and/or 704 may include, but is not limited to, (i) modifying a wireless operation of one or both of PBDs 702 and 704 (e.g., turning off the wireless antenna, reducing power of the wireless antenna, and/or modifying which wireless antennas are active), and/or (ii) modifying a thermal operation of one or both of PBDs 702 and 704 (e.g., adjusting a threshold temperature before one of the networked devices reduces operating power, adjusting the time before entering an idle-state after not playing media, modifying which device is completing particular processing tasks, changing which device is performing master device functions, and/or modifying an amplifier output power).

In some examples, reconfiguring one or more operational parameters of one or both of PBDs 702 and 704 involves modifying one or more wireless network configuration parameters of one or both of PBDs 702 and 704. Modifying the one or more wireless network configuration parameters includes, but is not limited to, (i) disabling a wireless antenna and/or transmitter of one or both of PBDs 702 and 704, (ii) reducing a power at which a wireless antenna of one or both of PBDs 702 and 704 transmits or otherwise operates, (iii) modifying a configuration of active wireless antennas of one or more of PBDs 702 and 704, (iv) powering off one or more wireless network interfaces of one or both of PBDs 702 and 704.

In some examples, modifying one more wireless network configuration parameters of one or both of PBDs 702 and 704 involves disabling a wireless antenna and/or wireless transmitter of one or both of PBDs 702 and 704. In these examples, disabling a wireless antenna and/or transmitter of one or both PBDs 702 and 704 is an available modification when a wired communication connection exists between PBDs 702 and 704. For example, when a wired communication connection (i.e. wired connection of connection 706) exists between PBDs 702 and 704, PBD 702 may cause PBD 704 to disable the wireless antenna and/or wireless transmitter of PBD 704 in response to determining a close proximity between PBDs 702 and 704. This may be beneficial because the wireless antenna and/or wireless transmitter of PBD 704 will not interfere with the wireless signal of PBD 702 when the wireless antenna and/or wireless transmitter of PBD 704 is disabled. In operation, after the wireless antenna and/or wireless transmitter of PBD 704 is disabled, data (e.g., media streams, commands to play the media streams, change volume, and/or power on or off) being sent to and from PBD 704 may be transmitted to and from PBD 704 through PBD 702, via the wired connection of connection 706 without interfering with the wireless operation of PBD 702. For example, and command from a wireless controller to cause PBD 704 to perform a playback command may be transmitted to PBD 704 via a wireless interface of PBD 702 and the wired connection of connection 706.

In some examples, modifying one or more wireless network configuration parameters of one or both of PBDs 702 and 704 may involve reducing a power at which a wireless antenna and/or transmitter of one or both of PBDs 702 and 704 operate. This modification is available irrespective of whether a wired communication connection exists between PBDs 702 and 704.

For example, when PBDs 702 and/or 704 determines there is a proximity between one another, one or both of PBDs 702 and 704 may reduce a power at which their respective wireless antennas and/or transmitters operate. This may be beneficial because it may allow one or both of PBDs 702 and 704 to operate with limited interference from one another, or at least less interference than if both PBDs 702 and 704 were operating at full transmission power. In operation, only one of PBDs 702 and 704 might reduce the power at which its wireless antenna/transmitter operates, leaving the other PBD's antenna/transmitter operating at full strength. In the configuration shown in FIG. 8, PBD 702 may be configured to operate its antenna(s)/transmitter(s) at full strength while PBD 704 may be configured to operate its antenna(s)/transmitter(s) at reduced strength because PBD 702 is on top of PBD 704 and the operations of antenna(s)/transmitter(s) of PBD 702 may interfere with the operations of antenna(s)/transmitter(s) of PBD 704 less than the operations of antenna(s)/transmitter(s) of PBD 704 may interfere with the operations of antenna(s)/transmitter(s) of PBD 702. Such a configuration may result in a better overall operating capacity for the two devices together. Further, if a wired connection does exist between PBDs 702 and 704, the PBD with reduced antenna/transmitter operating power may receive some information from the PBD operating at full transmission strength and other information directly. For instance, the PBD with reduced antenna/transmitter operating power may receive playback control commands via the reduced power antenna/transmitter, and media streams via the PBD operating at full transmission strength.

Additionally or alternatively, if the wired connection does exist between PBDs 702 and 704, one PBD may be configured to operate within a first wireless frequency band, and the other PBD may be configured to operate in a second wireless frequency band. For instance, PBD 702 may operate within a 2.4 GHz frequency band, while PBD 704 may operate within a 5 GHz band. In such a case, communication between other devices and PBD 702 over the 2.4 GHz frequency band may be sent directly to and from PBD 702, while communication between other devices and PBD 702 over the 5 GHz frequency band may be sent via PBD 704 and the wired connection. Analogously, communication between other devices and PBD 704 over the 5 GHz frequency band may be sent directly to and from PBD 704, while communication between other devices and PBD 704 over the 2.4 GHz frequency band may be sent via PBD 702 and the wired connection. Other examples are also possible.

In some examples, modifying one or more wireless network configuration parameters of one or both of PBDs 702 and 704 involves modifying a configuration of one or more active wireless antennas of one or both of PBDs 702 and 704. For example, if PBDs 702 and 704 each have a first set of one or more antennas on the top and a second set of one or more antennas on one or both sides, and if PBDs 702 and 704 are arranged as shown in FIG. 8, it may be beneficial for PBD 704 to set its current active antennas to its second set of antennas located on the side because its first set of antennas on top of PBD 704 might experience interference from the antennas of PBD 702. Likewise, it may be beneficial for PBD 702 to set its current active antennas to its first set of antennas located on the top of PBD 702 because its first set of antennas on the top will be less likely than its second set of antennas on the side to interfere with the second set of antennas of PBD 704. In some circumstances, PBDs 702 and 704 may be alternatively arranged as shown by the dotted outline of PBD 702 in FIG. 8. In this arrangement, PBDs 702 and 704 are in a side-by-side configuration and may be in physical contact with one another. Based on this arrangement, both PBDs 702 and 704 may set their active antennas to be the antennas on the top and on the sides facing away from the other PBD. The setting or modification of active antennas may be different for different arrangements of PBDs 702 and 704.

In some examples, modifying one or more wireless network configuration parameters of one or both of PBDs 702 and 704 involves powering off one or more wireless network interfaces (e.g., Bluetooth™, NFC, etc.) of one or both of PBDs 702 and 704, while leaving at least one wireless network interface active (e.g., WiFi, etc.). This may be beneficial for similar reasons as disabling the wireless antenna and/or transmitter of one or both of PBDs 702 and 704. However, powering off one or more wireless network interfaces may be available when a wired communication connection does not exist between PBDs 702 and 704. For example, if PBDs 702 and 704 are arranged as shown in FIG. 8 and no wired connection exists, it may not be feasible to disable the WiFi wireless antenna of one or both of PBDs 702 and 704 because PBDs 702 and/or 704 would not be able to receive information via its wired networked interface. But powering off one or more other wireless network interfaces (e.g., Bluetooth™, NFC, etc.) may reduce the interference experienced by one or both of PBDs 702 and 704 without inhibiting the ability to receive information related to media playback via another wireless interface (e.g., WiFi). For example, if PBD 702 determines a proximity between itself and PBD 704 and no wired connection exists, PBD 702 and PBD 704 can power off their respective Bluetooth™ and NFC interfaces to reduce interference, but keep their WiFi interfaces powered on. But if a wired communication connection does exist, then (i) PBD 704 can power off all its wireless interfaces, e.g., Bluetooth™, NFC, and WiFi, (ii) PBD 702 can power off its Bluetooth™ and NFC interfaces but keep its WiFi interface active, and (iii) PBD 702 can relay transmissions to/from PBD 704 via the wired connection of connection 706.

In some circumstances, the proximity of PBDs 702 and 704 may cause thermal problems (e.g., overheating) instead of (or in addition to) wireless connectivity problems. To overcome this potential problem, in some examples, one or both of PBDs 702 and 704 may reconfigure one or more operational parameters of one or both of PBDs 702 and 704. In these examples, reconfiguring one or more operational parameters of one or both of PBDs 702 and 704 may involve one or more of (i) adjusting a threshold temperature at which one or both of PBDs 702 and 704 reduce operating power, (ii) adjusting a time at which one or both of PBDs 702 and 704 enter an idle-state after not playing media, (iii) instructing one of PBDs 702 and 704 to execute a computing process assigned to the other PBD, (iv) reconfiguring one of PBDs 702 and 704 to perform a master device function and reconfiguring the other PBD to perform a slave device function, (v) modifying an amplifier output power of one or both of PBDs 702 and 704, and/or (vi) sending an instruction to a user to connect PBDs 702 and 704 via a wired communication connection and, in response to the user connecting PBDs 702 and 704, disabling the wireless network interface of one of PBDs 702 and 704. PBDs 702 and 704 can reconfigure these operational parameters irrespective of whether a wired network connection exists.

In some examples, reconfiguring one or more operational parameters of one or both of PBDs 702 and 704 may include adjusting a threshold temperature at which one or both of PBDs 702 and 704 reduce operating power. Typically, when one or more internal computing components (e.g., processor, memory, audio processing components, etc.) become overheated, PBDs 702 and 704 are configured to reduce operating power to avoid overheating and damaging these components.

In some circumstances, when PBDs 702 and 704 are in close proximity to one another, these components may overheat faster and/or components that do not typically overheat (e.g., wireless interface components) may begin to overheat. To remedy this problem, in some examples, one or both of PBDs 702 and 704 may reduce the threshold temperature at which one or both of PBDs 702 and 704 reduce operating power. In operation, PBDs 702 and 704 may be typically configured to reduce operating power after reaching an internal temperature of 55° C. However, if PBDs 702 and 704 are in proximity to one another, one or both of PBDs 702 and 704 may reduce operating power after reaching an internal temperature of 50° C.

Additionally, there may be scenarios when the placement of PBDs 702 and 704 cause certain components to overheat while the internal temperature remains below the threshold temperature necessary to cause PBDs 702 and 704 to reduce their operation power. In some circumstances, if PBDs 702 and 704 are positioned in the alternative arrangement shown in FIG. 8 (side by side), internal components located on the walls of PBDs 702 and 704 that are next to, and perhaps in physical contact with, each other may overheat while the overall system temperature remains under the threshold temperature. To remedy this problem, in some examples, one or both of PBDs 702 and 704 may monitor the temperatures of individual internal components. Individual components may each have their respective threshold temperature which, if reached, may cause PBDs 702 and 704 to reduce operating power. Using these temperatures, PBDs 702 and 704 can reduce their respective operating powers, or respective operating powers of subsystems within PBDs 702 or 704 based on the individual component temperatures. An example of a subsystem within a playback device may be an audio processing subsystem comprising an audio amplifier and a digital signal processor.

In one example, if PBDs 702 and 704 are arranged as shown in FIG. 8 (stacked), the components on the bottom of PBD 702 and the components on the top of PBD 704 might be at risk of overheating. PBD 702 may have its processor and audio processing components located on the bottom, while PBD 704 may have its wireless interface and antennas located on the top. In this example, when the processor of PBD 702 reaches its designated threshold temperature (e.g., 55° C.), PBD 702 reduces the power at which the processor operates (e.g., by reducing a clock speed, disabling certain processor subcomponents, or reducing the processing load placed on the processor) to avoid overheating. Likewise, when the wireless antennas of PBD 704 reach their designated threshold temperature (e.g., 45° C.), PBD 704 reduces the power at which the wireless antennas operate.

In some examples, the way in which PBDs 702 and 704 reduce the power at which certain components operate may vary based on the type of component. For example, PBD 702 may reduce the power at which its wireless antennas operate by disabling one or more of the wireless antennas. In another example, PBD 702 may reduce the power at which its speakers operate by lowering the amount of power supplied to the speakers. In yet another example, PBD 702 may reduce the power at which its processor operates by limiting the processing load assigned to the processor.

In some circumstances, the proximity of PBDs 702 and 704 may cause the overall internal temperature of PBDs 702 and 704 to exceed a threshold system temperature, potentially causing damage to one or both of PBDs 702 and 704. To remedy this problem, in some examples, PBDs 702 and 704 may reconfigure one or more operational parameters of one or both of PBDs 702 and 704. The reconfigurations may include adjusting a time at which one or both of PBDs 702 and 704 enter an idle-state after not playing media. Typically, PBDs 702 and 704 are configured to enter an idle-state after not playing media for a certain time (e.g., 3-5 minutes). When PBDs 702 and 704 are in an idle-state, they conserve power by temporarily disabling all unnecessary functions (e.g., speakers, audio amplifiers, microphones, etc.) until they receive a command to play media. The time period before entering an idle-state may be user-defined and/or a default time period set during manufacturing. For example, when PBDs 702 and 704 are in proximity to one another and the internal temperature of one or both of PBDs 702 and 704 exceeds a threshold temperature, PBDs 702 and/or 704 may reduce the time period at which one or both of PBDs 702 and 704 enter their respective idle-states (e.g., 30 seconds down from 4 minutes). This may be beneficial because it may allow PBDs 702 and 704 to reduce their internal temperatures in between media playback sessions.

In some circumstances, when PBDs 702 and 704 are stacked on top of one another, only one of PBDs 702 and 704 may experience overheating problems. In these situations, PBDs 702 and/or 704 may reconfigure one or more operational parameters of one or both of PBDs 702 and 704. One such reconfiguration may involve causing PBD 702 to execute one or more processing tasks otherwise performed by PBD 704.

In one example, PBD 704 may be configured to execute a first computing process and a second computing process (e.g., processing audio, outputting a system response, etc.). When PBDs 702 and 704 are in proximity to one another (stacked as shown in FIG. 8), PBD 704 may experience overheating problems because it is located beneath PBD 702. To avoid overheating, PBD 702 instead of PBD 704 may execute one or both of the first and second computing processes. As indicated previously, such reallocation of processing responsibility may be facilitated by PBD 702, PBD 704, and/or a cloud server. In one case, PBD 702 may receive from PBD 704 and/or the cloud server an assignment of the first and/or second computing processes and accordingly executes the assigned computing processes. In response to receiving confirmation from PBD 702 and/or the cloud server that PBD 702 has received and will execute the first and/or second computing processes, PBD 704 may cease executing the first and/or second computing processes. This reallocation of computing processes allows PBDs 702 and 704 to dynamically adjust the amount of processing being performed, resulting in a lower operating temperature for the PBD experiencing thermal problems.

In some situations, PBDs 702 and 704 are configured in a synchrony group such that one of PBDs 702 and 704 performs master device (may also be referred to as group coordinators) functions for the synchrony group and one of PBDs 702 and 704 performs slave device (may also be referred to as group members) functions for the synchrony group. A master device function may include functions that only one PBD performs, such as setting a master volume for all PBDs in media playback configuration 800, outputting a system response, processing and distributing audio content and playback timing information to other playback devices, and/or receive and audio playback instructions. A slave device function may include functions such as receiving audio content and playback timing information, and playback instructions from the master device and/or playing audio content. Typically, the PBD operating as the master device consumes more energy and generates more heat than the PBDs operating as slave devices because the master device performs more functions (and more processor-intensive functions) than the slave devices. Thus, it may be beneficial to reassign master device functions from a first PDB experiencing (or likely to experience) thermal issues to a second PBD operating a lower internal temperature than the first PBD.

For example, assume PBDs 702 and 704 are configured in a synchrony group. PBD 704 is configured to perform master device functions for the synchrony group, while PBD 702 is configured to perform slave device functions. PBDs 702 and/or 704 may determine a proximity between PBDs 702 and 704. In the configuration shown in FIG. 8, PBD 704 may be experiencing overheating problems based on its position beneath PBD 702. Likewise, PBD 702 may be operating at a cooler internal temperature than PBD 704 because the top of PBD 702 is exposed to the environment. In response determining that PBD 702 is in proximity to PBD 704 and that PBD 702 is operating a cooler temperature than PBD 704, PBD 704, as the master device, may reconfigure one or more operational parameters of both of PBDs 702 and 704. The reconfiguration may include switching the master and slave roles between PBD 702 and 704, i.e., reconfiguring PBD 702 to perform the master device functions for the synchrony group and reconfiguring PBD 704 to perform slave functions. This reconfiguration of master/slave device functions allows PBD 702, which is operating at a lower internal temperature, to complete tasks that generate more heat and consume more power.

In some examples, reconfiguring one or more operational parameters of one or both of PBDs 702 and 704 may include modifying (e.g., reducing) an amplifier output power of one or both of PBDs 702 and 704. This may be beneficial because reducing an amplifier output power generally reduces the amount of heat generated by a PBD. For example, if PBDs 702 and 704 are in proximity to one another and PBD 702 is located on top of PBD 704 as shown in FIG. 8, PBD 704 may experience overheating problems. To address this problem, PBDs 702 and/or 704 may reconfigure one or more operational parameters of PBD 704 by reducing the amplifier output power of PBD 704. This allows PBD 704 to operate at a lower temperature, avoiding potential overheating issues in a stacked configuration.

In some circumstances, PBDs 702 and 704 are arranged in a way that makes reconfiguring the above operational parameters unlikely to solve potential overheating issues. This arrangement may include stacking PBDs 702 and 704 on top of one another in an enclosed area without sufficient area to dissipate heat. To overcome this potential problem, one of PBDs 702 or 704 may disable all non-media playback-related systems (e.g., wireless network bridge or access point functions). An existence of a wired communication connection between PBDs 702 and 704 may allow the one of PBDs 702 or 704 to disable all non-media playback related systems.

However, in some circumstances, a wired communication connection does not exist between PBDs 702 and 704. To overcome this problem and assist in disabling all non-media playback related systems, in some examples, reconfiguring one or more operational parameters of one or both of PBDs 702 and 704 may include sending a user a prompt to connect PBDs 702 and 704 via a wired connection. Once a wired connection (via connection 706) is established between PBDs 702 and 704, one of PBDs 702 and 704 can disable all non-media playback related systems. As a further benefit, as discussed previously, a wired network connection between PBDS 702 and 704 may allow PBDs 702 and 704 to reconfigure various operational parameters of one or both of PBDs 702 and 704.

For example, PBDs 702 and 704 may be stacked as shown in FIG. 8 and placed inside a small bookshelf. In this example, PBDs 702 and 704 are not connected via connection 706. PBDs 702 and/or 704 may experience overheating problems in this configuration. To address this problem, PBDs 702 and 704 may first attempt to reconfigure the operational parameters of both of PBDs 702 and 704, in accordance with the methods described above. However, reconfiguring the operational parameters related to thermal problems may be insufficient for preventing one or both of PBDs 702 and 704 from overheating. In this example, PBD 702 may send an instruction to prompt the user to connect PBDs 702 and 704 via a wired connection. Once the wired connection is established, PBDs 702 and 704 reconfigure operational parameters as discussed previously in relation to scenarios in which a wired connection exists between PBDs 702 and 704.

d. Example Method

Figure 9:
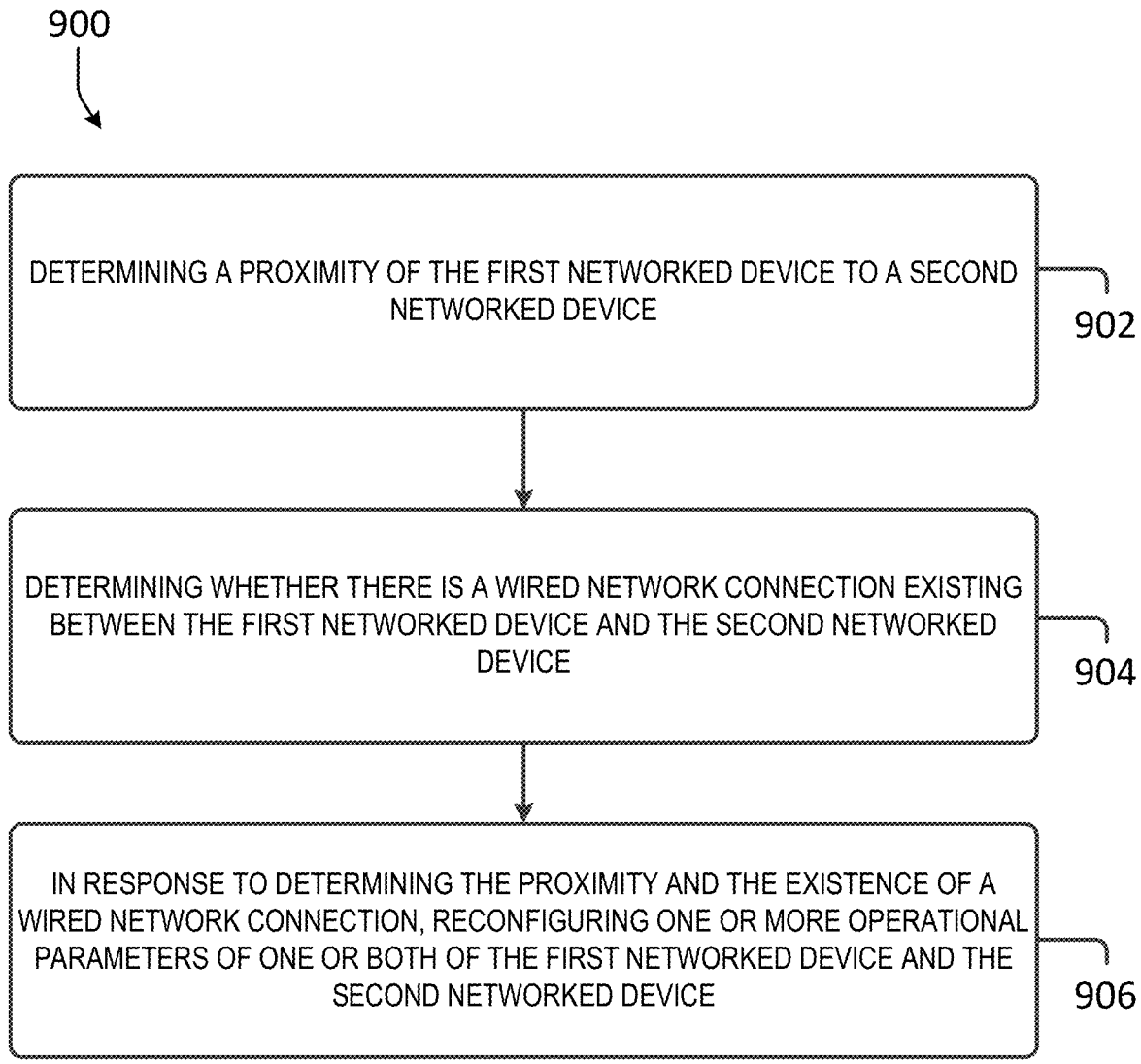
FIG. 9 shows an example method according to some embodiments.

Method 900 in FIG. 9 shows an embodiment of a method that can be implemented within an operating environment including or involving, for example, the media playback system 100 of FIG. 1, one or more playback devices 200 of FIG. 2, one or more control devices 300 of FIG. 3, the user interface of FIG. 4, the configuration shown in FIG. 5, the NMD shown in FIG. 6, the media playback configuration 700 in FIG. 7, and/or the media playback configuration 800 in FIG. 8. Method 900 may include one or more operations, functions, or actions as illustrated by one or more of blocks 902, 904 and 906. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 900 and other processes and methods disclosed herein, the flowchart shows functionality and operation of one possible implementation of some embodiments. In this regard, each block may represent a module, a segment, or a portion of program code, which includes one or more instructions executable by one or more processors for implementing specific logical functions or steps in the process. The program code may be stored on any type of computer readable medium, for example, such as a storage device including a disk or hard drive. The computer readable medium may include non-transitory computer readable medium, for example, such as tangible, non-transitory computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 900 and other processes and methods disclosed herein, each block in FIG. 8 may represent circuitry that is wired to perform the specific logical functions in the process.

Method 900 begins at block 902, which includes a first networked device (or alternatively a computing device configured to control the first networked device), determining a proximity of the first networked device to a second networked device.

In some examples, determining the proximity of the first networked device to the second networked device includes comparing a current radio signature of the first networked device with an expected radio signature for the first networked device. In some embodiments, determining the proximity of the first networked device to the second networked device includes comparing a current radio signature of the first networked device with an expected radio signature for the first networked device, and determining whether the current radio signature is within a certain threshold of the expected radio signature.

In some examples, determining the proximity of the first networked device to the second networked device additionally or alternatively includes determining the proximity based on a Bluetooth (or other type of communication protocol) connection between the first networked device and the second network device. In one case, determining whether the first networked device and the second network device are within a proximity of each other may involve determining whether a received signal strength indication (RSSI) of the Bluetooth connection between the first networked device and the second networked device is above a threshold strength.

In some examples, determining the proximity of the first networked device to the second networked device additionally or alternatively includes determining whether a proximity sensor on the first networked device detects the presence of the second networked device.

In some examples, determining the proximity of the first networked device to the second networked device additionally or alternatively includes determining whether the first networked device and the second networked device are within a threshold distance using a near-field communication (NFC) protocol.

In some examples, determining the proximity of the first networked device to the second networked device additionally or alternatively includes receiving, by the first networked device, a message indicating the second networked device is in proximity to the first networked device.

In some examples, determining the proximity of the first networked device to the second networked device additionally or alternatively includes determining whether an orientation sensor on the first networked device indicates the first networked device and the second networked device are in a stacked configuration.

In some examples, determining the proximity of the first networked device to the second networked device additionally or alternatively includes receiving an input from a user indicating the first networked device and the second networked device are in proximity to each other.

Next, method 900 advances to block 904, which includes determining whether there is a wired network connection existing between the first networked device and the second networked device.

In some examples, determining whether a wired network connection exists between the first networked device and the second networked device includes determining whether the first networked device and the second networked device are communicatively connected to each other via a physical network cable.

In some examples, if a determination is made that a wired network connection does not exist between PBDs 702 and 704, and a determination is made that PBDs 702 and 704 are both capable of a wired network connection, a message may be sent to a controller used to configure and/or control the PBDs 702 and 704, to cause the controller to prompt a user to connect PBDs 702 and 704 via a wired network connection. Thereafter, a determination may be made that a wired network connection exists between PBDs 702 and 704.

Next, method 900 advances to block 906, which includes, in response to determining the proximity and the existence of a wired network connection, reconfiguring one or more operational parameters of one or both of the first networked device and the second networked device.

In some examples, reconfiguring one or more operational parameters of one or both of the first networked device and the second networked device includes modifying one or more wireless network configuration parameters of one or both of the first networked device and the second networked device.

In some examples, modifying one or more wireless network configuration parameters of one or both of the first networked device and the second networked device includes disabling one or more of a wireless antenna, wireless transmitter, and/or wireless transceiver of one or both of the first networked device and the second networked device.

In some examples, modifying one or more wireless network configuration parameters of one or both of the first networked device and the second networked device additionally or alternatively includes reducing a power at which one or more of a wireless antenna, wireless transmitter, and/or wireless transceiver of one or both of the first networked device and the second networked device operates.

In some examples, modifying one or more wireless network configuration parameters of one or both of the first networked device and the second networked device additionally or alternatively includes reducing a power at which one or more of a wireless antenna, wireless transmitter, and/or wireless transceiver of one or both of the first networked device and the second networked device operates.

In some examples, modifying one or more wireless network configuration parameters of one or both of the first networked device and the second networked device additionally or alternatively includes modifying and/or setting a configuration of active wireless antennas, wireless transmitters, and/or wireless transceivers of one or more of the first networked device and the second networked device.

In some examples, modifying one or more wireless network configuration parameters of one or both of the first networked device and the second networked device additionally or alternatively includes powering off one or more wireless network interfaces of one or both of the first networked device and the second networked device.

In some examples, reconfiguring one or more operational parameters of one or both of the first networked device and the second networked device additionally or alternatively includes adjusting a threshold temperature at which one or both of the first networked device and second networked device reduce operating power.

In some examples, reconfiguring one or more operational parameters of one or both of the first networked device and the second networked device additionally or alternatively includes adjusting a time at which one or both of the first networked device and second networked device enter an idle-state after not playing media.

In some examples, the first networked device is configured to execute at least a first computing process and a second computing process. In such examples, reconfiguring one or more operational parameters of one or both of the first networked device and the second networked device additionally or alternatively includes the first networked device (i) instructing the second networked device to execute the second computing process and (ii) in response to receiving confirmation that the second networked device has received the instruction, ceasing to execute the second computing process.

In some examples, the first networked device and the second networked device are members of a synchrony group where each of the first networked device and the second networked device are configured to play back media content in synchrony with each other, where the first networked device is configured to perform a master device function for the synchrony group. In such examples, reconfiguring one or more operational parameters of one or both of the first networked device and the second networked device additionally or alternatively includes (i) reconfiguring the second networked device to perform the master device function for the synchrony group, and (ii) reconfiguring the first networked device to perform a slave function in the synchrony group.

In some examples, reconfiguring one or more operational parameters of one or both of the first networked device and the second networked device additionally or alternatively includes modifying an amplifier output power of one or both of the first networked device and the second networked device.

In some examples, reconfiguring one or more operational parameters of one or both of the first networked device and the second networked device additionally or alternatively includes sending an instruction to a user to connect the first networked device and the second networked device via a wired communication connection.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

What is claimed is:

1. Tangible, non-transitory computer-readable media comprising instructions encoded therein, wherein the instructions, when executed by one or more processors, cause a first playback device to perform a method comprising:
    determining a proximity of the first playback device to a second playback device, wherein the first playback device and the second playback device are configured to play back media content in synchrony with each other as members of a synchrony group, wherein the first playback device is configured to perform master device functions for the synchrony group;
    determining whether there is a wired network connection existing between the first playback device and the second playback device; and
    in response to determining the proximity and the existence of a wired network connection, (i) disabling a wireless of antenna of the second playback device, and (ii) reconfiguring one or more operational parameters of one or both of the first playback device and the second playback device, wherein reconfiguring one or more operational parameters of one or both of the first playback device and the second playback device comprises configuring the first playback device to perform slave device functions for the synchrony group and configuring the second playback device to perform master device functions for the synchrony group.

2. The tangible, non-transitory computer-readable media of claim 1, wherein determining the proximity of the first playback device to the second playback device comprises comparing a current radio signature of the first playback device with an expected radio signature for the first playback device.

3. The tangible, non-transitory computer-readable media of claim 1, wherein determining the proximity of the first playback device to the second playback device comprises determining the proximity based on a Bluetooth connection between the first playback device and the second playback device is above a threshold strength.

4. The tangible, non-transitory computer-readable media of claim 1, wherein determining the proximity of the first playback device to the second playback device comprises determining whether a proximity sensor on the first playback device detects the presence of the second playback device.

5. The tangible, non-transitory computer-readable media of claim 1, wherein determining the proximity of the first playback device to the second playback device comprises determining whether the first playback device and the second playback device are within a threshold distance using a near-field communication (NFC) protocol.

6. The tangible, non-transitory computer-readable media of claim 1, wherein determining the proximity of the first playback device to the second playback device comprises receiving, by the first playback device, a message indicating the second playback device is in proximity to the first playback device.

7. The tangible, non-transitory computer-readable media of claim 1, wherein determining the proximity of the first playback device to the second playback device comprises determining whether an orientation sensor on the first playback device indicates the first playback device and the second playback device are in a stacked configuration.

8. The tangible, non-transitory computer-readable media of claim 1, wherein determining the proximity of the first playback device to the second playback device comprises receiving an input from a user indicating the first playback device and the second playback device are in proximity to each other.

9. The tangible, non-transitory computer-readable media of claim 1, wherein determining whether a wired network connection exists between the first playback device and the second playback device comprises determining whether the first playback device and the second playback device are connected via a wired network interface.

10. The tangible, non-transitory computer-readable media of claim 1, wherein reconfiguring one or more operational parameters of one or both of the first playback device and the second playback device comprises modifying one or more wireless network configuration parameters of one or both of the first playback device and the second playback device.

11. The tangible, non-transitory computer-readable media of claim 10, wherein modifying one or more wireless network configuration parameters of one or both of the first playback device and the second playback device comprises disabling a wireless antenna of the first playback device.

12. The tangible, non-transitory computer-readable media of claim 10, wherein modifying one or more wireless network configuration parameters of one or both of the first playback device and the second playback device comprises reducing a power at which a wireless antenna of one or both of the first playback device and the second playback device operates.

13. The tangible, non-transitory computer-readable media of claim 10, wherein modifying one or more wireless network configuration parameters of one or both of the first playback device and the second playback device comprises modifying a configuration of active wireless antennas of one or more of the first playback device and the second playback device.

14. The tangible, non-transitory computer-readable media of claim 10, wherein modifying one or more wireless network configuration parameters of one or both of the first playback device and the second playback device comprises powering off one or more wireless network interfaces of one or both of the first playback device and the second playback device.

15. The tangible, non-transitory computer-readable media of claim 1, wherein reconfiguring one or more operational parameters of one or both of the first playback device and the second playback device comprises adjusting a threshold temperature at which one or both of the first playback device and second playback device reduce operating power.

16. The tangible, non-transitory computer-readable media of claim 1, wherein reconfiguring one or more operational parameters of one or both of the first playback device and the second playback device comprises adjusting a time at which one or both of the first playback device and second playback device enter an idle-state after not playing media.

17. The tangible, non-transitory computer-readable media of claim 1, wherein the first playback device is configured to execute at least a first computing process and a second computing process, and wherein reconfiguring one or more operational parameters of one or both of the first playback device and the second playback device comprises the first playback device (i) instructing the second playback device to execute the second computing process and (ii) in response to receiving confirmation that the second playback device has received the instruction, ceasing to execute the second computing process.

18. The tangible, non-transitory computer-readable media of claim 1, wherein reconfiguring one or more operational parameters of one or both of the first playback device and the second playback device comprises modifying an audio amplifier output power of one or both of the first playback device and the second playback device.

19. The tangible, non-transitory computer-readable media of claim 1, wherein reconfiguring one or more operational parameters of one or both of the first playback device and the second playback device comprises sending an instruction to a user to connect the first playback device and the second playback device via a wired communication connection.

20. The tangible, non-transitory computer-readable media of claim 1, wherein, prior to configuring the first playback device to perform slave device functions for the synchrony group and configuring the second playback device to perform master device functions for the synchrony group, the second playback device is configured to perform slave device functions for the synchrony group.

* * * * *